(No Model.)
B. J. SPILKER.
MIXER.
No. 595,354.　　　　Patented Dec. 14, 1897.
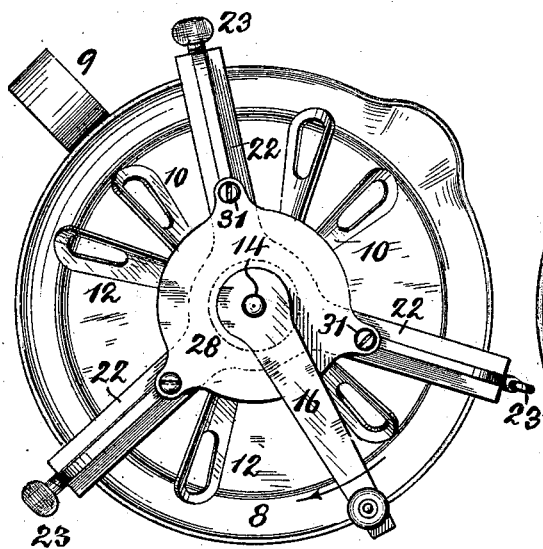
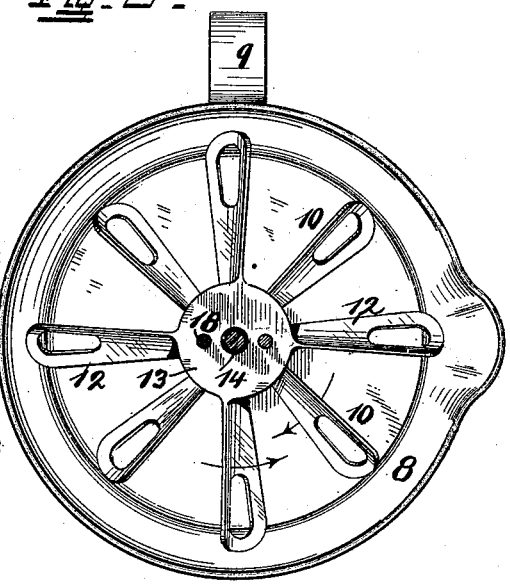
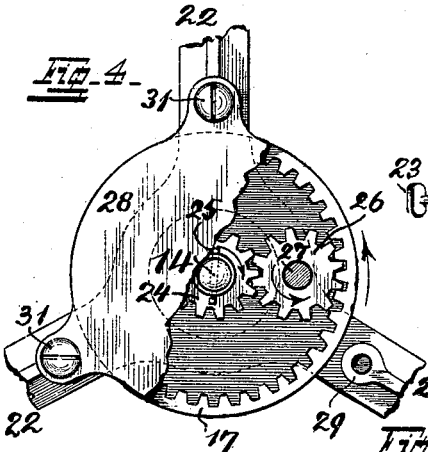
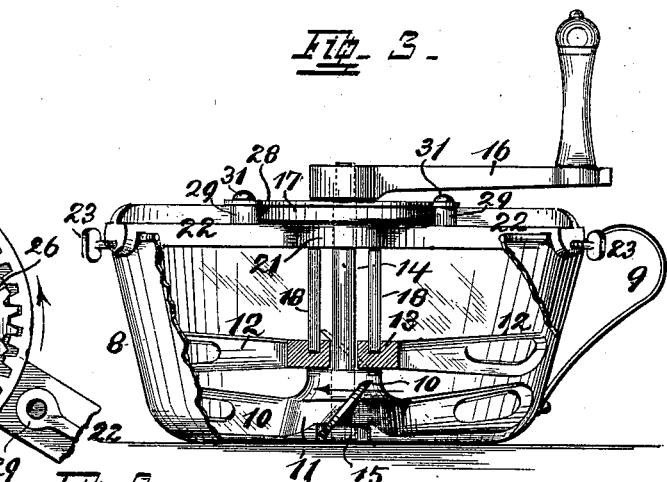
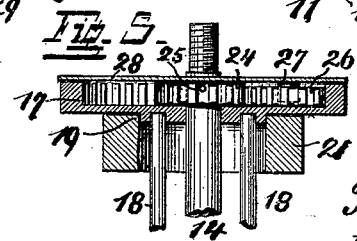
Attest
John B. Rogers
Arthur Kline
Inventor
Bernard J. Spilker
by C. Spengel Atty.

UNITED STATES PATENT OFFICE.

BERNARD J. SPILKER, OF CINCINNATI, OHIO.

MIXER.

SPECIFICATION forming part of Letters Patent No. 595,354, dated December 14, 1897.

Application filed August 7, 1896. Serial No. 601,966. (No model.)

*To all whom it may concern:*

Be it known that I, BERNARD J. SPILKER, a citizen of the United States, and a resident of Cincinnati, Hamilton county, State of Ohio, have invented a certain new and Improved Mixer; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to an improved mixer to be principally used for the preparation and kneading of dough, but may also be used in any other suitable connection where the function of the device may be applied to advantage—as, for instance, in beating eggs and other culinary purposes.

The features of this invention consist, first, of a set of blades or beaters revolving in opposite directions and so shaped as to shove the mass or dough to be operated on into each other's path. The other features embrace the mechanical movement and all details of construction necessary to enable these beaters to operate in the manner described.

In the following specification and particularly pointed out in the claims is found a full description of the invention, its operation, parts, and construction, which latter is also illustrated in the accompanying drawings, in which—

Figure 1 is a top view of the device complete. Fig. 2 is a similar view with the upper part containing the movement taken away. Fig. 3 is a side elevation, partly in section. Fig. 4 is an enlarged top view of the movement which operates the beaters, and Fig. 5 is a vertical section of the preceding figure.

8 is a suitable vessel, preferably of sheet metal, within which the beaters are supported and which is provided with a suitable handle 9. Of the beaters I have preferably four to a set, by which is meant those revolving together in one plane and in one direction. 10 are the beaters of the lower set, revolving in the direction shown by the arrow and all secured to a hub 11. They are inclined in a manner that their lower edges precede their upper ones, considered with reference to the direction of their motion, so that, since these edges are close to the bottom of the vessel, the dough or other matter is caused to be raised up from the former and crowded over the upper edges of said beaters. 12 are the beaters of the other set, projecting from a hub 13 and rotating in opposite direction to the beaters of the set first mentioned and above them. They are also inclined and act upon the mass as soon as raised by the lower beaters within their path.

To obtain the most thorough and intimate intermingling of the ingredients of the mixture, the two sets of beaters revolve at a speed different from each other. In this case the lower set moves at higher speed, the proportion of speed being about three to one. For their movement the lower set of beaters is connected by their hub 11 to a shaft 14, the lower end of which is supported in a bearing 15 and the upper end of which has connected to it a crank-arm 16 for operation. The upper set 12 is driven by an internally-toothed gear-wheel 17, closed on its under side and connected to the hub 13 of this set by rods 18, passing between the two. This gear-wheel is centrally supported above the vessel, and for such purpose is provided with a shoulder or hub 19, projecting from the under side and fitted into a circular bearing 21, forming the central part of a frame consisting of three arms 22, adapted for connection to the upper edge of vessel 8. For this latter purpose lugs are provided depending from the ends of arms 22, which carry screws 23, whereby the attachment is completed, as may be readily understood. (See Fig. 3). This gear-wheel also serves as a support for the upper end of shaft 14, which passes through an opening in the center of the closed under side thereof, but has no connection with it, while shaft 14 serves at the same time as a central support for hub 13, through which it, also passes, without connection, however. The rotation of this gear-wheel 17 is accomplished by a pinion 24, rigidly secured to shaft 14, preferably by a pin 25, and a transmitting-pinion 26, which meshes into it and into the teeth of wheel 17. This latter pinion is supported on a stud-shaft 27, which depends from and is supported on a plate 28, which covers the open upper side of gear-wheel 17, but has no connection therewith, it being supported on bosses 29 of frame-arms 22, for which purpose parts of it project beyond wheel 17. The connection to the bosses is accomplished by screws 31. The beaters are perforated, whereby the mass is cut up and more thoroughly mixed, preventing also lumping of the same.

The particular direction of rotation shown with reference to the inclination of the beaters is not absolutely essential, but best results are obtained if adhered to. To prevent rotation in opposite direction, the connection of crank-arm 16 to the upper end of shaft 14 is by screw-thread, as shown, and unscrews if turned in the wrong direction.

As will be seen, all operating parts, including the operating-handle, are centrally supported and secured with reference to the vessel, thereby obtaining the best results, considered from a mechanical standpoint. No inclosed inaccessible parts are within the vessel, preventing thorough cleaning and complete removal of the contents.

Having described my invention, I claim as new—

1. In a mixer of the kind described the combination of a vessel, a frame having a central circular bearing 21 and arms 22 reaching to the upper edge of the vessel thereby supporting the frame, an internal gear-wheel 17 closed on its under side and having a hub 19 projecting therefrom and fitted into bearing 21, a central shaft 14 fitted into a central opening through the closed side of gear-wheel 17, a plate 28 which covers the open side of the latter and is fixedly secured to the frame, a pinion 24 on shaft 14, an intermediate gear-wheel 26, a stud 27 depending from plate 28 to hold it in place, gear-wheel 26 being in mesh with pinion 24 and gear-wheel 17 for the purpose of transmitting motion from the former to the latter, an operating-handle on shaft 14 and beaters connected to the latter and to the hub of wheel 17.

2. In a mixer of the kind described, the combination of a vessel, a frame having a central circular bearing 21 and arms 22 reaching to the upper edge of the vessel thereby supporting the frame, lugs depending from arms 22 and screws 23 whereby to secure the frame to the vessel, an internal gear-wheel 17 closed on its under side and having a hub 19 projecting therefrom and fitted into bearing 21, a central shaft 14 fitted into a central opening through the closed side of gear-wheel 17, a plate 28 which covers the open side of the latter and projecting in part beyond it, bosses 29 on the frame upon which these projecting parts rest and to which they are secured by screws, a pinion 24 on shaft 14, an intermediate gear-wheel 26, a stud 27 depending from plate 28 to hold it in place, gear-wheel 26 being in mesh with pinion 24 and gear-wheel 17 for the purpose of transmitting motion from the former to the latter, an operating-handle on shaft 14, a set of beaters connected to the lower end of the latter, another set of beaters above the set first mentioned and rods 18 connecting the latter set to the hub of internal gear-wheel 17.

3. In a mixer of the kind described, the combination of a vessel, an internal gear-wheel supported centrally above the former by means of a frame resting upon the edges of the vessel, a centrally-supported operating-shaft having an operating-handle and passing loosely through the center of the internal gear-wheel which forms its upper bearing, a lower bearing secured to the center of the bottom of the vessel, a pinion on the operating-shaft, an intermediate gear for transmitting the motion from the pinion to the internal gear and beaters connected to the latter and to the operating-shaft.

In testimony whereof I hereunto affix my signature in presence of two witnesses.

BERNARD J. SPILKER.

Witnesses:
C. SPENGEL,
ARTHUR KLINE.